United States Patent
Trietz et al.

(10) Patent No.: US 8,097,998 B2
(45) Date of Patent: Jan. 17, 2012

(54) LINEAR DRIVE HAVING SHOCK COMPENSATION

(75) Inventors: Thomas Trietz, Villingen-Schwenningen (DE); Bernhard Blocher, Villingen-Schwenningen (DE); Guido Schmid, Triberg (DE); Helmut Schneider, Zimmern-Floezlingen (DE); Martin Willmer, Friesenheim (DE); Stefan Schwamberger, Lohsa Ot Hermsdorf (DE); Ullrich Kreiensen, Deisslingen (DE); Vladimir V. Popov, Villingen-Schwenningen (DE)

(73) Assignee: Minebea Co., Ltd., Nagano (JP)

( * ) Notice: Subject to any disclaimer, the term of this patent is extended or adjusted under 35 U.S.C. 154(b) by 351 days.

(21) Appl. No.: 12/579,973

(22) Filed: Oct. 15, 2009

(65) Prior Publication Data

US 2010/0102645 A1   Apr. 29, 2010

(30) Foreign Application Priority Data

Oct. 29, 2008   (DE) .......................... 10 2008 053 646

(51) Int. Cl.
*H01L 41/08* (2006.01)
(52) U.S. Cl. .................................................. 310/323.02

(58) Field of Classification Search .............. 310/323.02
See application file for complete search history.

(56) References Cited

U.S. PATENT DOCUMENTS

| | | | | |
|---|---|---|---|---|
| 5,191,688 A * | 3/1993 | Takizawa et al. | ............ | 29/25.35 |
| 6,232,697 B1 * | 5/2001 | Mizumoto | ............ | 310/317 |
| 6,798,117 B2 * | 9/2004 | Johansson et al. | ....... | 310/323.02 |
| 7,116,038 B2 * | 10/2006 | Miyazawa et al. | ....... | 310/323.02 |
| 7,309,943 B2 * | 12/2007 | Henderson et al. | ....... | 310/323.02 |
| 7,439,652 B2 * | 10/2008 | Ganor et al. | ............ | 310/323.02 |
| 7,679,265 B2 * | 3/2010 | Higashionji et al. | ..... | 310/323.02 |

FOREIGN PATENT DOCUMENTS

WO         2004001867 A    12/2003

* cited by examiner

*Primary Examiner* — Mark Budd
(74) *Attorney, Agent, or Firm* — Duane Morris, LLP

(57) ABSTRACT

A directly coupled linear drive having a drive unit and a sliding element that are disposed in a frame, the sliding element, actuated by the drive unit, being capable of effecting a movement in a direction of translation with respect to the frame and having a blocking device for blocking the sliding element in the frame in the event of a shock load to the sliding element, the blocking device having a body coupled to the sliding element that absorbs the shock load and is disposed such that the shock load of the body counteracts the shock load of the sliding element.

22 Claims, 15 Drawing Sheets

LINEAR DRIVE HAVING SHOCK COMPENSATION

FIELD OF THE INVENTION

The invention relates to linear motors in general and more specifically to directly coupled linear drives, such as a friction-coupled linear drive or a magnetic drive. Examples of friction-coupled linear drives, for which the invention finds application, include electromechanical linear motors having a drive element that is made of an electrostrictive or magnetostrictive material. Also known are polymer actuators that are made of a combination of polymer and metallic materials and that allow an electrically controllable movement of a polymer body.

BACKGROUND OF THE INVENTION

WO 2004/001867 describes an example of a piezoelectric motor that provides a linear drive for an actuator. The motor uses a piezoelectric drive element that operates at high speed and with high precision. The piezoelectric motor described in WO 2004/001867 A1 comprises a stator that consists of two series-connected bending sections and a power transmission element which is mounted on the stator and transmits the bending action of the drive element to a sliding element. The drive element is aligned parallel to the sliding element and is made of an electrostrictive material, such as a piezoelectric material. These kinds of materials change their shape when exposed to an electric voltage or a magnetic field. The bending sections of the drive element are disposed symmetrical to the power transmission elements, the two bending sections performing a bending action that is similar to a traveling wave when an electric voltage is applied. The wave-like movement is transmitted via the power transmission elements to the sliding element and moves the sliding element incrementally. The movement of the drive elements is transmitted via the power transmission elements to the sliding element in that the power transmission elements and the sliding element are in frictional contact. The electromechanical motor may be used as a regulating device that achieves fast and precise lateral displacement of the sliding element and thus of an actuator connected to it. Piezoceramics have very short response times and thus very short operating times. One possible application for a friction-coupled miniature motor of this type is in a locking system, where the sliding element is used as an actuator to close a lock cylinder.

These kinds of friction-coupled linear drives and other directly coupled linear drives—in other words drives that do not involve a rotational movement being translated into a translation movement but rather in which the translation movement is directly generated—are generally used for moving an actuator in a direction of translation. Directly coupled linear drives have the disadvantage that it is possible to manipulate the movement of the actuator by applying an external force. In particular, when exposed to a shock or impact load or any other mechanical stress, such as vibration that is applied to the linear drive from an external source, the actuator may slip along the drive unit because the directly coupled linear drive has only a limited self-restraining effect. This self-restraining effect is found in the region of static friction between the sliding element and drive unit. For linear drives in which a rotational movement is translated by a thread into a translation movement, an external force varies in its effect. If the thread pitch, for example, is low, an external force, such as a shock load, immediately results in damage to the thread. If the pitch of the thread is high, a shock load results in the actuator slipping through, similar to directly coupled linear drives.

If used, for example, for actuating a lock cylinder, the fact that the actuator could be manipulated by a simple external shock load or an externally applied vibration would of course be highly disadvantageous. Safety standards require that electronic locks as well withstand shock loads of some 1500 times the acceleration of gravity (1500 g) or more. One g corresponds to an acceleration of 9.81 m/sec$^2$.

It is an object of the invention to provide a linear drive that cannot be manipulated by the application of external forces, such as shock loads and vibrations, and at the same time can maintain its original performance.

SUMMARY OF THE INVENTION

The invention provides a linear drive having a drive unit and a sliding element that are disposed in a frame. The sliding element is actuated by the drive unit so as to effect a movement in a direction of translation with respect to the frame. According to the invention, a blocking device is provided for blocking the sliding element with respect to the frame in the event of shock or impact loads to the sliding element. In a first embodiment of the invention, this blocking device has a compensating body coupled to the sliding element that is equally exposed to the shock load and disposed such that an acceleration of the compensating body caused by the shock load counteracts an acceleration of the sliding element caused by the shock load and compensates this shock load. In another embodiment variant, the blocking device has a compensating body that is likewise exposed to the shock load and disposed such that the movement of the compensating body due to the shock load counteracts a movement of the sliding element due to the shock load. In general terms, the invention thus provides as a blocking device a moveable mass that is disposed in relation to the sliding element of the linear drive such that it counteracts a movement of the sliding element caused by an external shock load. For this purpose, the blocking device does not need its own power supply nor does it require any means for recognizing the shock load and triggering the blocking device, but rather, according to the invention, the blocking device is activated directly and immediately by the shock load that also acts on the sliding element of the linear drive and—without the blocking device according to the invention—could cause an undesirable movement of the sliding element.

In a first preferred embodiment of the invention, the compensating body is coupled with the sliding element via a lever arm that is preferably supported by means of a bearing point on the frame, one end of the lever arm interacting with the sliding element and the other end of the lever arm interacting with the compensating body. The system consisting of the compensating body, lever arm and sliding element is adjusted such that the sum of the torques that act on the lever arm through a shock load in the direction of translation, is zero or at least approximately zero. In other words, the mass of the compensating body and the mass of the sliding element, taking into account the lever principle, are in equilibrium. A shock load that acts in the direction of translation of the linear drive on the compensating body and on the sliding element equally, will not cause any displacement of the sliding element nor of the compensating body because these two are in equilibrium thanks to the lever arm. This blocking effect is achieved independent of friction.

The compensating body may be carried on the frame, within the frame, or outside it. It may be adapted in shape to the frame or to a housing of the linear drive and take the shape, for example, of an elongated cube or a segment of a cylinder. To achieve a compensating body for small-scale constructions that has a high mass, a comparatively heavy material is preferably used, for example a metal such as brass, in manufacturing the compensating body.

When the compensating body and the sliding element are coupled using a lever arm, care must be taken that the lever arm is supported on the frame such that no bouncing occurs in the event of a shock load. This can preferably be realized by suspension of the lever arm in the bearing point, using, for example, an axle.

In an alternative embodiment, the compensating body is coupled with the sliding element using a Bowden cable or via a toothed wheel and a toothed rack, substantially the same blocking effect being achieved as with the lever arm described above. In this alternative embodiment, the mass of the compensating body should be equal to or at least approximately equal to the mass of the sliding element.

In the example of the above-mentioned piezoelectric motor, a coupling of the compensating body and the sliding element by using a toothed wheel and toothed rack is particularly suitable for a drive unit that acts on one side of the sliding element, wherein the toothed rack may be provided on the opposite side of the sliding element.

In another embodiment of the invention, the blocking device has a spring device that is coupled with the compensating body and designed such that it is deflected by the shock load so as to be able to engage with the sliding element. This second embodiment of the invention is based on the deflection of a spring in the event of a shock load, the deflection amplitude on the one hand being determined by the compensating body coupled to the spring and on the other hand by the design of the spring itself. The spring is designed such that in the event of a shock load it becomes engaged with a defined point of the sliding element and blocks it. The mass of the compensating body, the design of the spring and the spring constant are preferably adjusted to the impact force that can be expected.

It is expedient if the spring device is fixed on the frame and has at least one spring arm that extends in the direction of the sliding element. The compensating body is disposed on the spring arm.

In a particularly advantageous embodiment, the spring device has a spring ring that has a number of spring arms extending radially inwards, a compensating body being disposed on each spring arm. This spring ring encloses the sliding element, so that on deflection of the spring arms, the sliding element is blocked at its circumference simultaneously from different sides.

In another embodiment, the spring device has a leaf spring that is connected at one end to the frame and carries the compensating body at the other end. The leaf spring is preferably designed with a recess through which the sliding element passes.

In yet another embodiment, the spring device has a suspension spring that is connected to the frame via two pendulum arms. The suspension spring has a central hole through which the sliding element is led.

In yet another embodiment, the blocking device has a bent leaf spring that is designed such that it is stretched by a shock load so as to become engaged with the sliding element. One end of the bent leaf spring is connected to the frame and its other end becomes engaged with the sliding element at an end face of the sliding element, for example, in order to block at least one direction of movement of the sliding element.

Whereas the known friction-coupled linear drives, such as piezoelectric linear drives, can absorb a force of impact of up to a maximum of 100 G through their friction coupling, thanks to the invention, reliable blocking of the sliding element for shock loads of over 500 G, and even up to 1500 G and beyond can be achieved.

BRIEF DESCRIPTION OF THE DRAWINGS

The invention is explained in more detail below on the basis of preferred embodiments with reference to the drawings. The figures show.

DETAILED DESCRIPTION OF EMBODIMENTS

Figure 1:
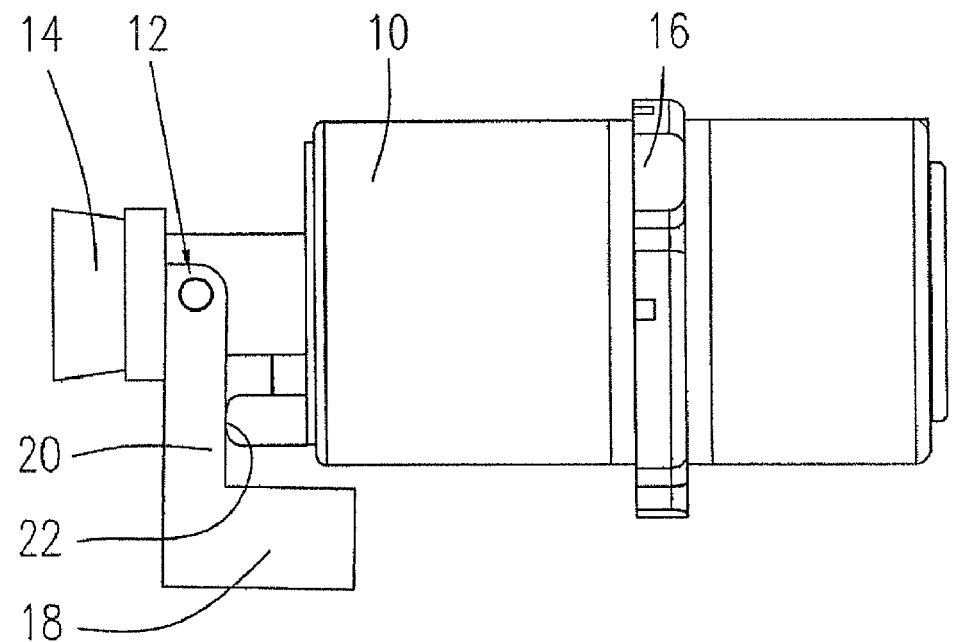
FIG. 1 a side view of a friction-coupled linear drive according to a first embodiment of the invention.
Figure 2:
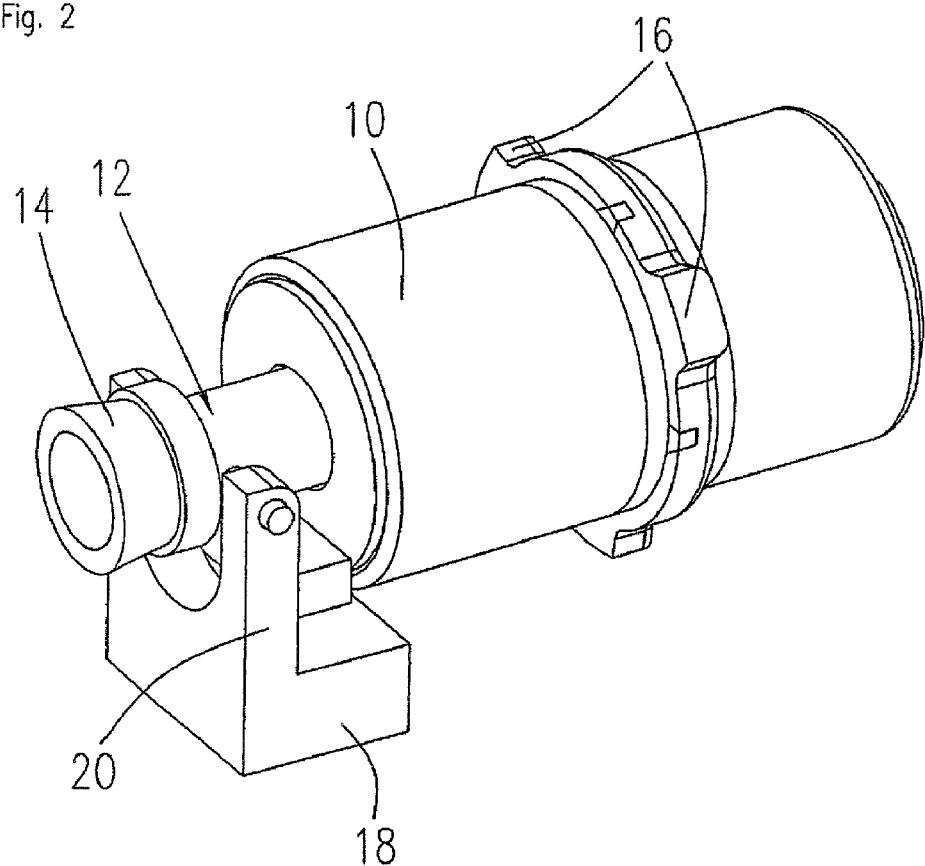
FIG. 2 an isometric view of the linear drive of FIG. 1.

FIGS. 1 and 2 show a side view as well as an isometric view of the friction-coupled linear drive according to one embodiment of the invention. In FIGS. 1 and 2, first a drive housing 10 and a sliding element of the linear drive, more specifically an actuator 12 connected to the sliding element, are illustrated. A blocking pin 14 is mounted on the actuator 12, the blocking pin 14 being used in the locking application mentioned at the outset to block the lock cylinder. Damping elements taking the form of elastomer members 16 are mounted on the outside circumference of the drive housing 10. The elastomer members which in the illustrated embodiment take the approximate shape of cuboid blocks may be directly molded or bonded to the housing 10, or connected in some other manner to the drive housing 10. Instead of using the illustrated elastomer members, damping strips may be mounted in an axial direction or in a circumferential direction on the outside surface of the drive housing 10. In an alternative embodiment, instead of the elastomer members 16, one or more O-rings may be mounted on the circumference of the drive housing 10. These may be held in position by grooves or by using positioning lugs.

In the final assembled position of the friction-coupled linear drive according to the invention, the elastomer members 16 come to lie between the drive housing 10 and a hole or a housing of the application (not illustrated) in which the drive is installed. In the event of mechanical stress, particularly a shock load, vibration and suchlike, the elastomer members 16 absorb a part of this mechanical stress and reduce it through their deformation in the direction of excitation. Here, the elastomer members 16 are designed such that they are particularly effective in dampening external excitation that acts parallel to the direction of movement of the linear drive. There has to be sufficient space available in the final assembled position to allow the linear drive to move in the direction of excitation in the event of mechanical stress, in order to reduce the stress energy. This measure alone decreases the susceptibility of the linear drive to any shock load and reduces the risk of the sliding element moving due to external excitation.

In the case of the illustrated embodiment having block-shaped elastomer members 16, the geometry of the supporting surface of the elastomer member 16 determines the effective deformation. These kinds of elastomer members can dampen shock loads in such a way that the shock load does not cause any undesirable displacement of the sliding element. For heavier shock loads, however, their damping effect is inadequate.

Thus according to the invention, the first embodiment has a blocking device taking the form of a compensating body 18 coupled to the actuator 12, the blocking device being connected to the actuator 12 using a lever arm 20. The lever arm 20 is supported at a bearing point 22 on the drive housing 10, the lever arm 20 being pivotable about this bearing point 22.

In the event of an external shock load to the actuator and thus to the sliding element 36, from the left, for example, in the drawing plane, this impact has an equal effect on the sliding element 36 as it does on the compensating body 18, so as to push both of them towards the right in the drawing plane. Since the sliding element 36 and the compensating body 18 are coupled to each other via the lever arm 20 and the bearing point 22, the torques generated in the bearing point 22 at the ends of the lever arm 20 cancel each other out, so that the system as a whole remains in equilibrium. In the event of a shock load, this goes to produce a self-retarding system where the position of the sliding element 36 and thus of the actuator 12 cannot be manipulated through any external influence.

Figure 3:
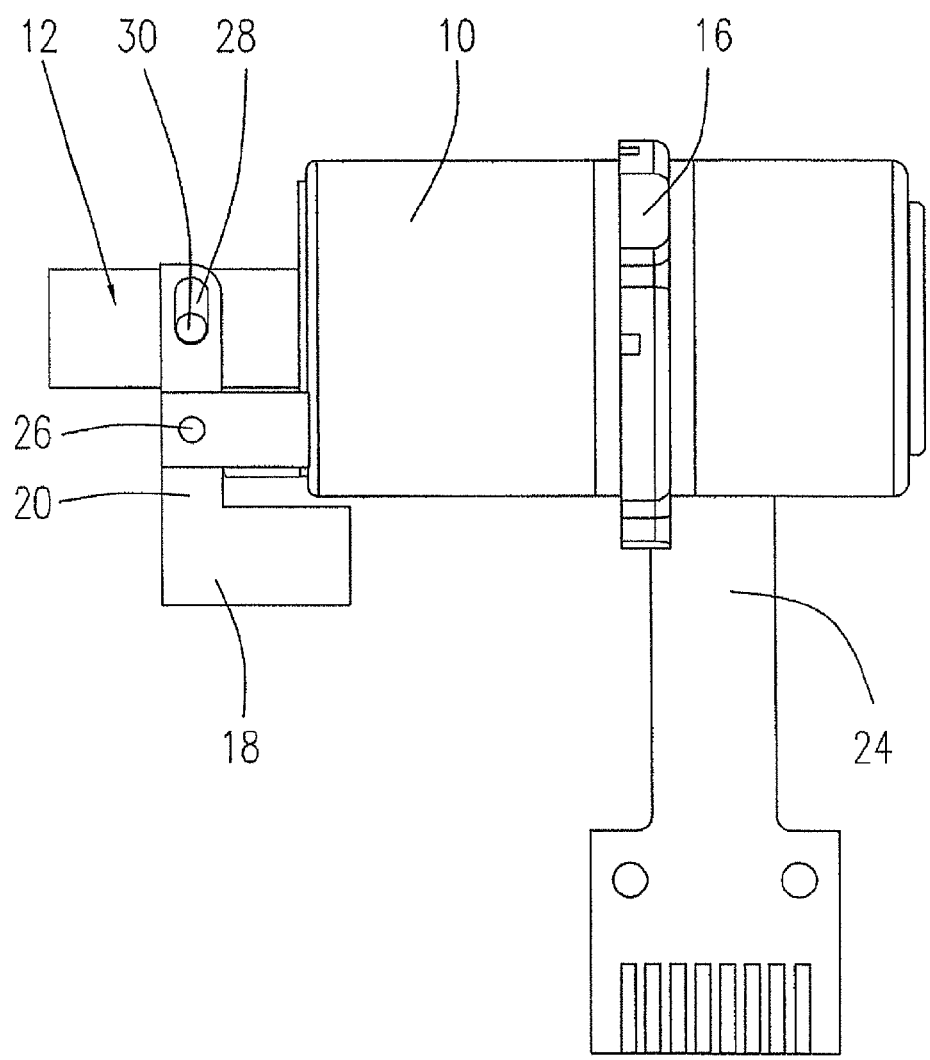
FIG. 3 a side view of a friction-coupled linear drive according to a modification of the first embodiment shown in FIGS. 1 and 2.

FIG. 3 shows a modification of the linear drive of FIGS. 1 and 2, related components being indicated by the same reference numbers. In the view of FIG. 3, in addition to the components illustrated in FIGS. 1 and 2, a connecting component 24 taking the form of a flexible circuit board is shown, the connecting component 24 providing the terminal for power supply and signal lines.

In the embodiment of FIG. 3, the lever arm 20 is hinged to the drive housing 10 using a swivel pin 26, so that it is supported in a more stable manner and any bouncing of the lever arm 20 can be avoided in the event of a shock load. The lever arm 20 is coupled to the actuator 12 using a long slot 28 and a stub shaft 30, so that it can follow the movement of the actuator 12 into the drive housing 10 and out of it again (to the right and left in the drawing plane).

As an alternative, the lever arm 20 may also abut an end face of the blocking pin 14 facing the drive housing 10 on the side of the actuator 12 (not illustrated). This makes it possible to restrain impact movements whose direction of excitation would push the sliding element 36 into the drive housing 10, i.e. only in one direction. A variant of this kind is much more cost-effective since no machining of the actuator 12 for its coupling to the lever arm 20 is required. With regard to the functioning of the system comprising the sliding element, actuator 12, lever arm 20 and compensating body 18, the same applies as described with reference to FIG. 3.

Figure 4:
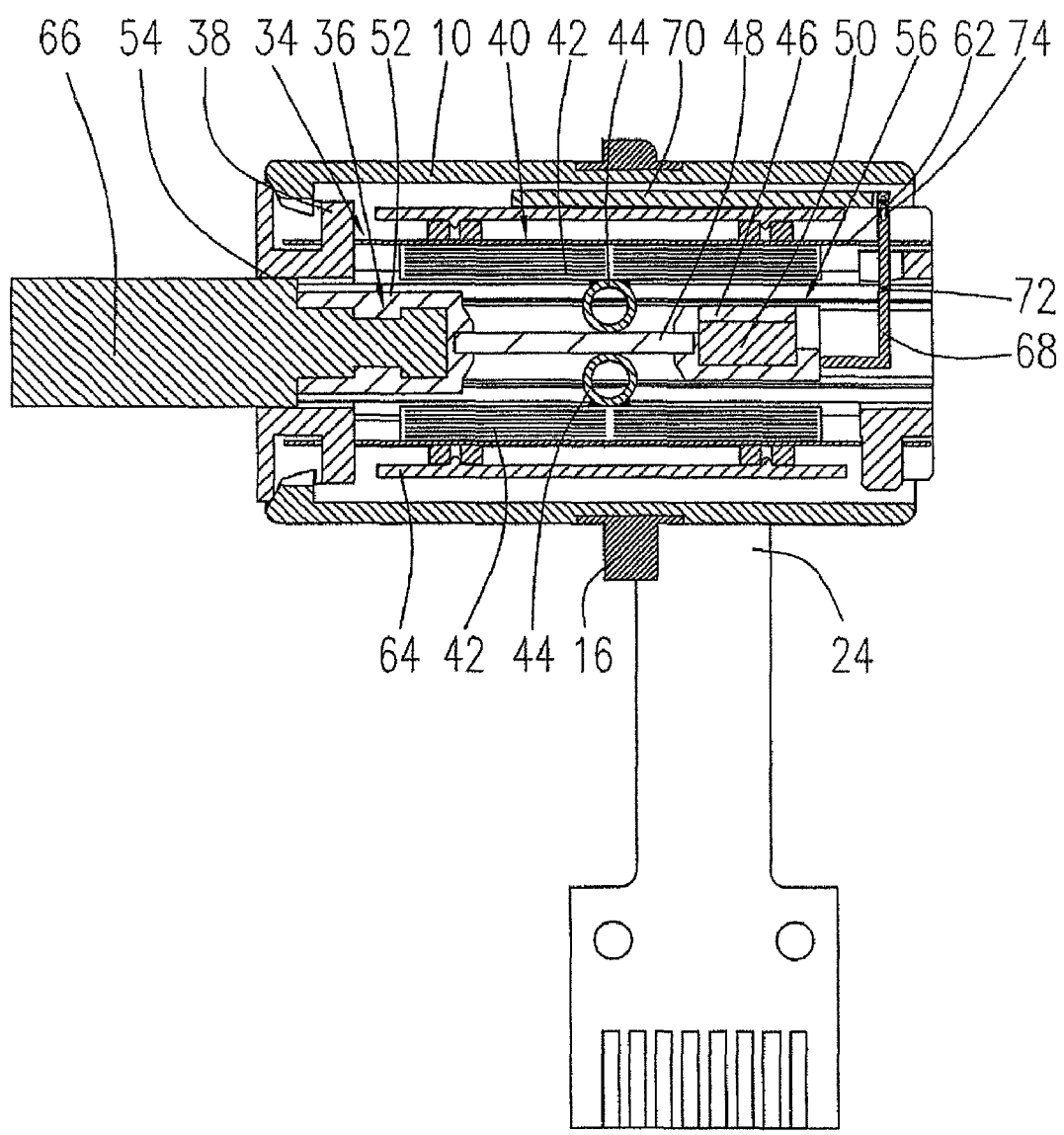
FIG. 4 a sectional view through a friction-coupled linear drive according to a second embodiment of the invention.

FIG. 4 shows a further embodiment of the linear drive according to the invention in a sectional view, the linear drive of FIG. 4 being designed as an electromechanical motor, particularly a piezoelectric motor. Related components are indicated by the same reference numbers.

The electromechanical motor shown in FIG. 4 comprises a stator 34, i.e. a stationary component, and a sliding element 36, i.e. a moving component, that can move with respect to the stator in a direction of translation, in the direction of the motor axis. The main components of the stator 34 include a frame component 38 and a drive unit 40. The drive unit 40 comprises two parallel electromechanical drive elements 42, each of which is associated with a power transmission element 44. The electromechanical drive elements 42 are made of a material whose form changes when an electric voltage or, in another embodiment, a magnetic field is applied to the drive element 42. Examples of these kinds of materials include electrostrictive materials, particularly piezoelectric and magnetostrictive materials as well as polymer actuators. The drive elements 42 are preferably made of a piezoelectric material that changes its shape when an electric voltage is applied and, vice versa, emits an electric voltage on deformation. In the illustrated embodiment, the power transmission elements 44 are tube-shaped. They should possess a certain elasticity in the direction perpendicular to the drive element 42. They may be connected to the drive element by means of bonding, for example.

As explained in more detail below, the drive unit interacts with the sliding element 36 whose main components include a supporting component 46 and a drive rail 48. The supporting component 46 is preferably formed as an injection-molded plastic part and holds the drive rail 28 at its two end faces. The supporting component may be made, for example, of a thermoplastic, such as polyetherimide, having a teflon component of some 10-20%. Other materials lie within the scope of the invention, high abrasion resistance and a low coefficient of friction being desirable. The drive rail 48 is preferably made of a ceramic, such as aluminum oxide ceramic, having high abrasion resistance. To increase the coefficient of friction of the surface of the drive rail, the surface may be provided with a groove pattern or some other kind of fluting.

The supporting component 46 is used to hold the drive rail 48 and moreover to receive a sensor magnet 50 as well as an adapter piece 52. The sensor magnet 50 is used to measure the position of the sliding element 36, as explained in more detail below. The adapter piece 52 is used for connecting an actuator 66 that is moved by the electromechanical motor in the direction of translation.

The drive rail 48, the sensor magnet 50 and the adapter piece 52 are preferably held in the supporting component 46 in a non-positive and positive fit using snap-in connections or by injection-molding.

A first sliding bearing 54 is formed between the supporting component 46 and the frame component 38; a second sliding bearing 56 is formed between the adapter piece 52 held in the supporting component 46 and the frame component 38. The supporting component 46 is thus preferably made of a plastic having a low coefficient of friction, such as a teflon-containing plastic.

The sensor magnet 50 interacts with a Hall sensor 58, or other magnetic sensors, in order to measure the position of the sliding element 36 with respect to the frame component 38. The Hall sensor 58 and the drive elements 42 are mounted on a flexible printed circuit board (FPC) 62 that is placed about the frame component 38. The circuit board 62 is held in position by a clamp 64. The circuit board 62 may be extended laterally to allow signal and power supply lines to be led out of the motor. The connecting component 24 is then provided by the circuit board 62.

The Hall sensor 58 makes it possible to detect the magnetic field intensity of the sensor magnet 50 over the entire traveling distance of the sliding element, this magnetic field density being proportional to the lateral displacement of the sliding element. This makes it possible to determine the current position of the sliding element as an analogue quantity; limitation to discrete positions not being necessary.

The frame component 38 is held in the drive housing 10 in a non-positive and positive fit by means of a snap-in connection. The drive housing 10 may simply be slid over the frame component 38 until the snap-in fasteners snap in, and ensures good protection for the electromechanical motor.

The motor operates as follows: The two drive elements 42 are disposed parallel to the drive rail 48 on each side of the drive rail. Each drive element 42 comprises two bending sections on each side of the centrally disposed power transmission elements 44. The two bending sections are thus arranged in series along the surface of the drive rail 48 in the direction of the intended movement of translation (in the direction of the motor axis). These bending sections are preferably made up of bimorph piezoelectric elements that can be bent in a direction perpendicular to the direction of translation. Each bimorph piezoelectric element comprises two parallel individually excitable active volumes, whereby a bending action is achieved through the application of different voltages to the active volumes. Concerning the basic functioning of the electromechanical motor, reference is additionally made to WO 2004/001867 A1.

The bending induces a wave that moves from a first end of the drive element 42, in the direction of its other end. Without losses, the drive unit 40 would operate in resonance and a wave would be reflected at the other end of the drive element 42. This is described in more detail in WO 2004/001867 A1 as referred to above.

The drive element 42 is generally driven by electric voltage impulses that are applied to the bending sections. Due to the bending action of the drive element 42 that continues over the length of the drive element 42, a corresponding movement of the power transmission elements 44 is induced that is transferred to the drive rail 48. Here, the power transmission elements 44 move both perpendicular as well as parallel to the surface of the drive rail 48. The drive rail 48 can thereby be moved incrementally forwards and backwards in the direction of translation.

In the embodiment of FIG. 4, the sliding element 36 is coupled to a compensating body 70 using a lever arm 68. The lever arm 68 is pivotably mounted on the frame component 38 at a bearing point 72, and connected to the compensating body 70 via a long slot 74. Again in this embodiment, the sum of the torques of the system comprising the compensating body 70, lever arm 68 and sliding element 36 is zero. Without the blocking system formed by the compensating body 70 and the lever arm 68, in the event of a shock load the sliding element 36 could slip through between the power transmission elements 44, since only friction coupling is provided here. Although the friction coupling may prove adequate for absorbing shock loads of up to 100 G for example, with heavier shock loads, it is not possible to prevent the sliding element 36 from slipping through. The actual shock load that can be compensated depends of course on the design and size of the linear drive. The sizes described here apply by way of example for the lock application described at the outset.

With the linear drive according to the invention, shock loads in the direction of translation act not only on the sliding element 36, but also on the compensating body 70, both being accelerated in the same direction, but due to the connection of the lever arm 68, the system is self-retarding. Frictional forces do not occur since a movement of the sliding element 36 is totally prevented.

As described above, the compensating body is made of a comparatively heavy material, for example a metal such as brass, so as to provide the same leverage force as that of the sliding element for small-scale constructions. In a further development of the invention (not illustrated in the figures) a magnet may be integrated in the compensating body, the magnet having the same or approximately the same magnetic intensity as the sensor magnet 50. Alternatively, the compensating body itself may be made of a magnetic material. This further development of the invention not only has the effect of enabling the compensating body to compensate an external shock load of the linear drive but also of making the linear drive immune to external manipulation with a magnet. An external magnet that interacts with the sensor magnet 50 could namely be used to move the sliding element 36 via the sensor magnet 50 in the direction of translation. In this modification of the invention, however, the external magnet would not only act on the sensor magnet but also on the magnetic compensating body, the system being self-retarding due to the connection via the lever arm.

In practice, a compensating body having an integrated magnet could have an influence on the magnet characteristic of the Hall sensors 58, which, however, could be taken into account when evaluating the Hall signals.

The embodiment of FIG. 4 differs from the previously described embodiments particularly in that the compensating body 70 is disposed within the drive housing 10. Since for many electromechanical motors only very little space is available for the disposal of the compensating body within the housing, it is expedient if the compensating body takes the form of a cylinder segment or any other form adapted to the space available.

The embodiment of FIG. 4 moreover differs from the previously described embodiments in that the lever arm 68 engages within the drive housing 10 with the end of the sliding element 36 facing away from the actuator 66. This has the advantage that the actuator 66 has no attachments whatsoever and can thus be optimally adapted to the respective application.

Figure 5:
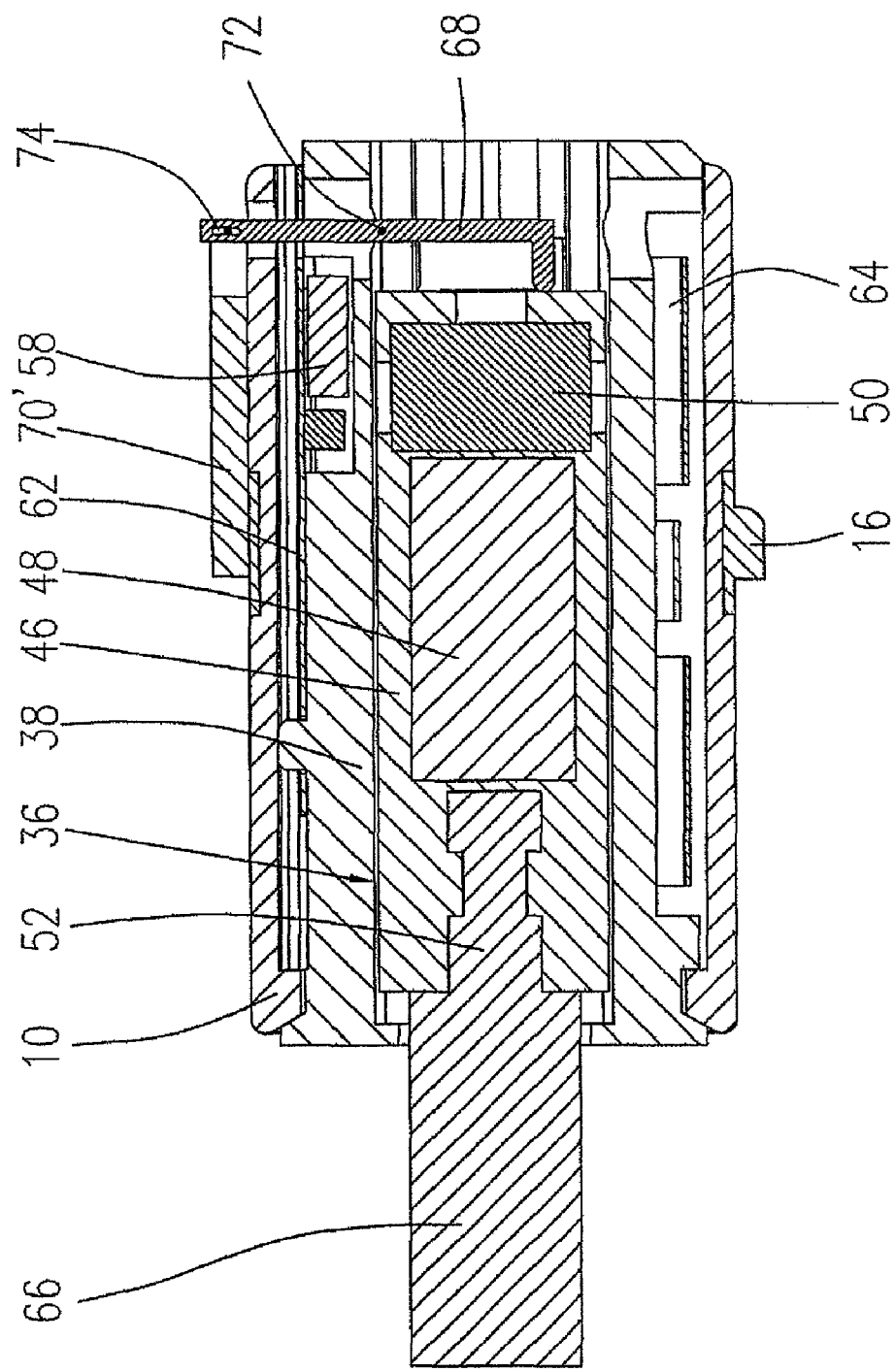
FIG. 5 a sectional view through a friction-coupled linear drive according to a third embodiment of the invention.

FIG. 5 shows a further embodiment of the linear drive according to the invention in a sectional view, the sectional view of FIG. 5 being rotated by 90° about the longitudinal axis of the drive with respect to the view of FIG. 4. Hence, the drive unit 40 cannot be seen in this view, but it is possible to see the Hall sensor 58 that is missing in the view of FIG. 4. Related components are indicated by the same reference numbers.

The embodiment of FIG. 5 differs from the embodiment of FIG. 4 in that the compensating body 70' is disposed outside the drive housing 10. In this embodiment, the compensating body 70' is carried on the outside of the drive housing 10. For the rest, the functioning of the system comprising the compensating body 70', lever arm 68 and sliding element 36 is the same as previously described with reference to FIG. 4. Bores in the drive housing 10 and the frame component 38 are large enough to allow the lever arm 68, during regular operation of the sliding element 36, to deflect and follow its movement.

In the embodiments of FIGS. 4 and 5, the blocking device is designed such that it absorbs a shock load in only one direction, specifically only a shock load that acts on the actuator 66, so as to move it into the drive housing 10. This, however, is exactly the critical movement that as a rule should be prevented, for example, when the linear drive finds application in a door lock where the actuator 66 is used to close a lock cylinder. In the embodiment of FIG. 3, on the other hand, the blocking system consisting of the lever arm 20 and compensating body 18 prevents an undesirable movement of the sliding element 36 in both directions of translation.

Figure 6A:
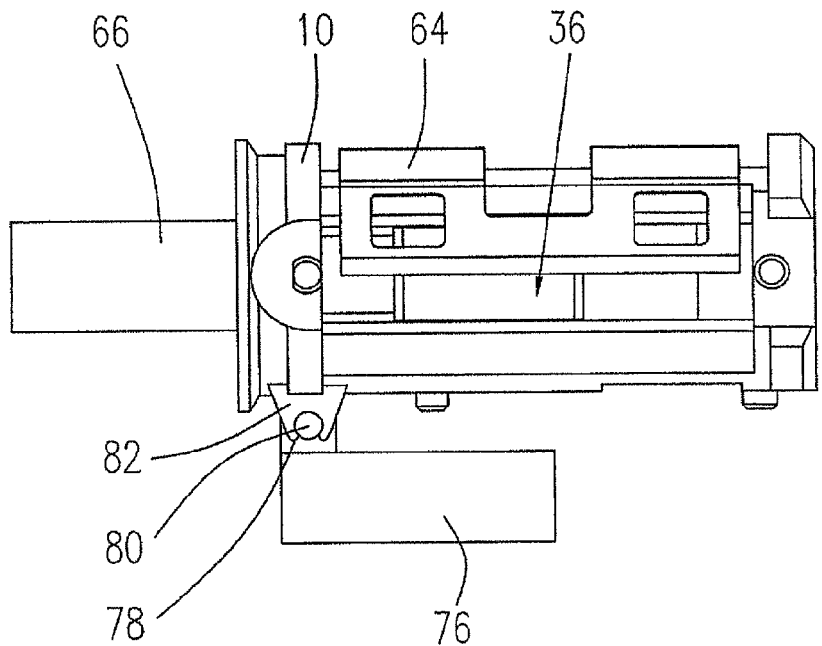
FIGS. 6A and 6B side views of a friction-coupled linear drive according to a fourth embodiment of the invention in a blocked position and in a released position.
Figure 6B:
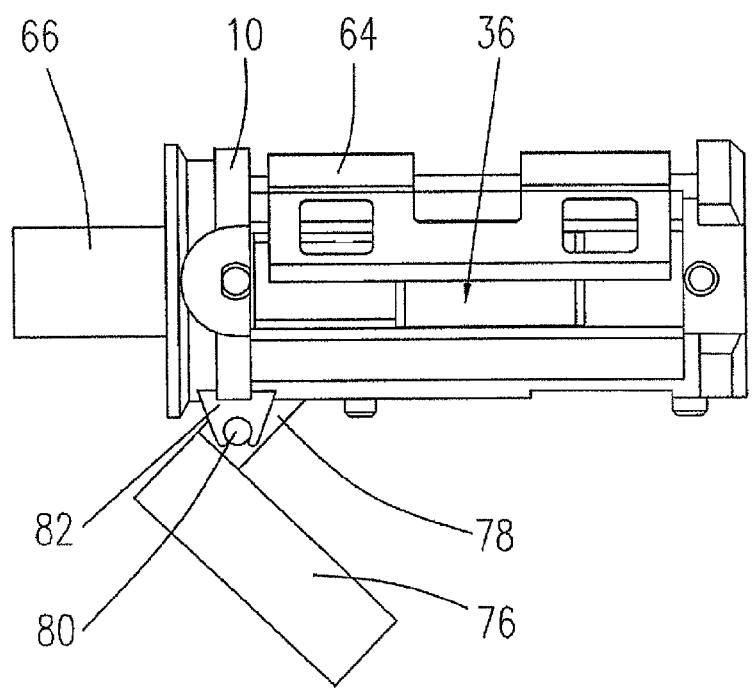
Figure 6C:
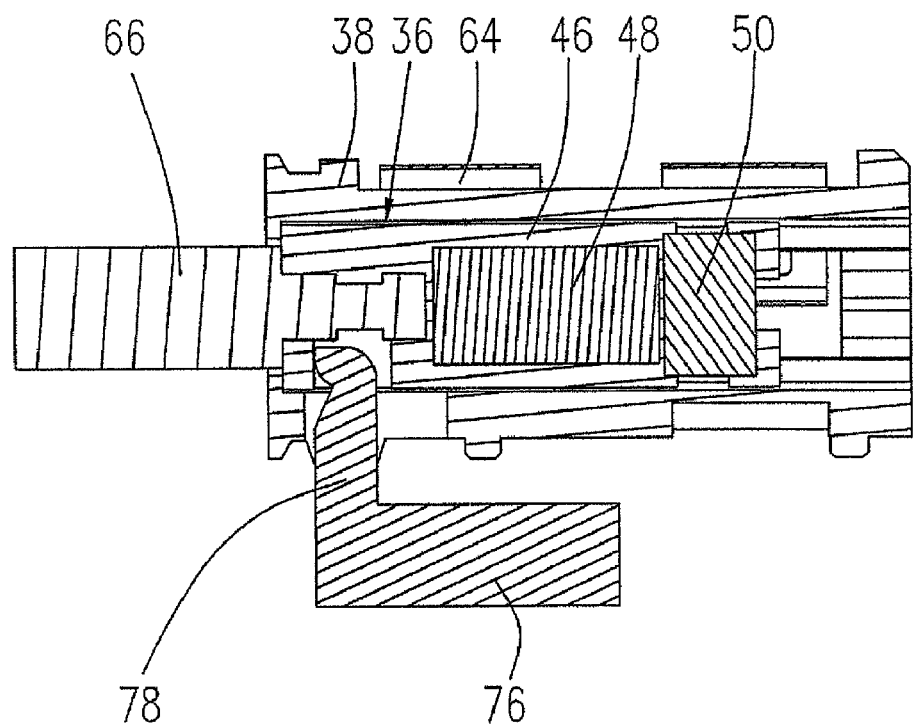
FIGS. 6C and 6D sectional views through the linear drive of FIGS. 6A and 6B.
Figure 6D:
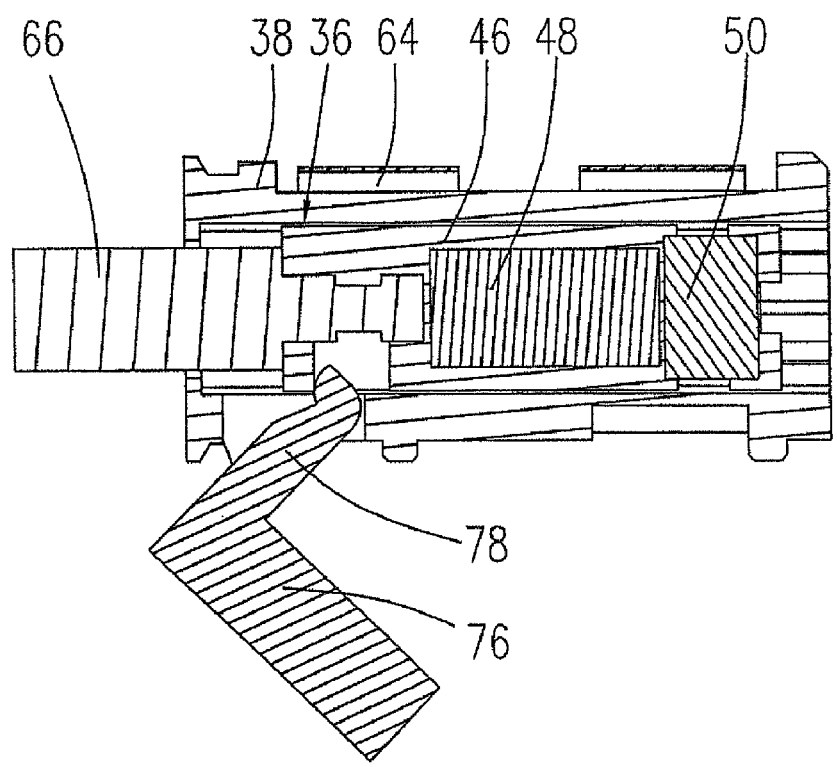

A further embodiment of the invention is shown in FIGS. 6A to 6D, FIGS. 6A and 6B showing an external view of the linear drive without housing and FIGS. 6C and 6D showing a sectional view of the linear drive, along the same sectional plane as FIG. 5. For the sake of simplicity, the drive housing and the circuit board with the electronics have been omitted. Related parts are indicated by the same reference numbers as in FIG. 5.

In the embodiment of FIGS. 6A to 6D, a compensating body 76 is coupled via a lever arm 78 with the sliding element 36. The lever arm 78 is supported by means of stub shafts 80 in a receiving portion 82 connected to the housing 10. The lever arm 78 engages in the sliding element 36 at a shoulder of the actuator 66. The functioning of the blocking device formed from the compensating body 76 and the lever arm 78 is as described with reference to the preceding embodiments. When the sliding element 36 and thus the actuator 66 move into the drive housing 10, the lever arm 78 is deflected accordingly, as illustrated in FIGS. 6B and 6D.

Figure 7A:
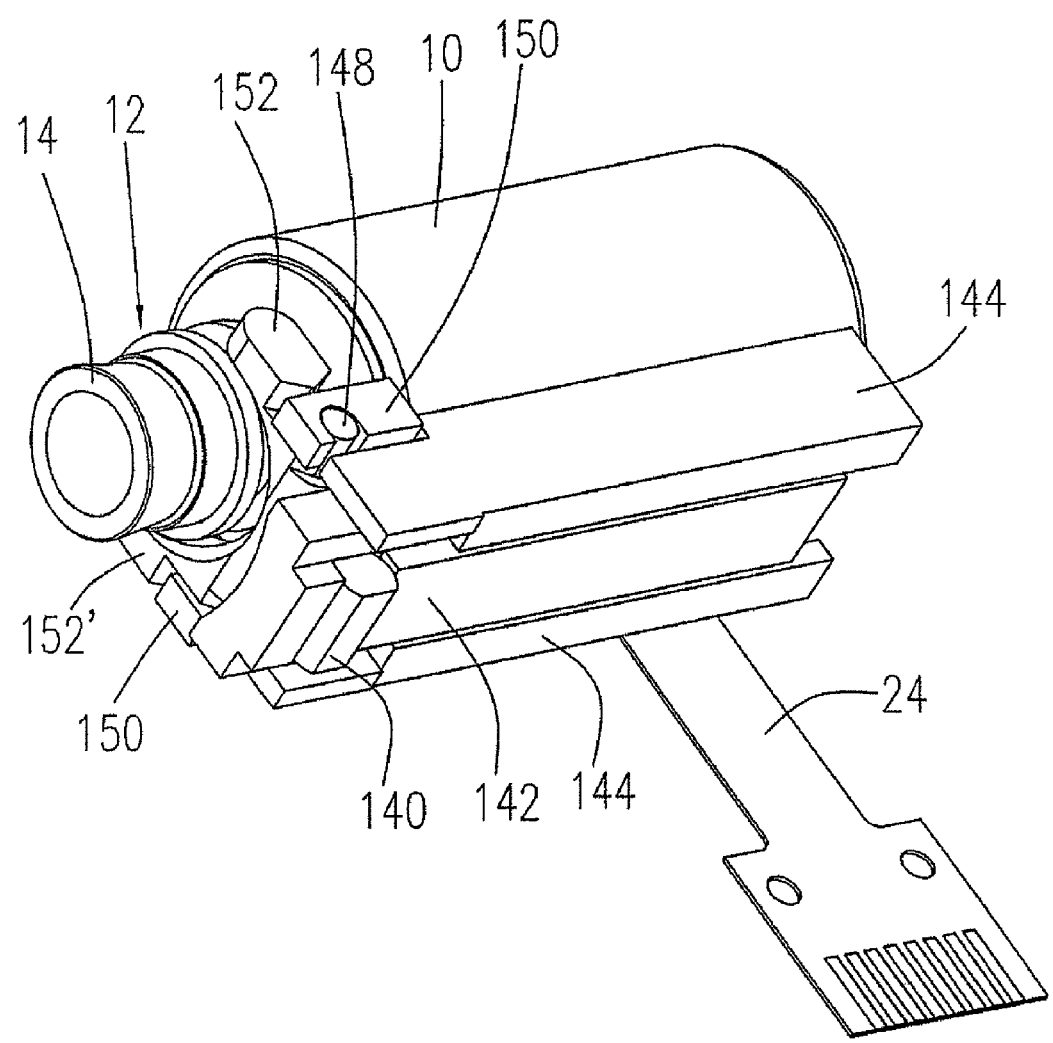
FIG. 7A an isometric view of a friction-coupled linear drives according to a fifth embodiment of the invention.
Figure 7B:
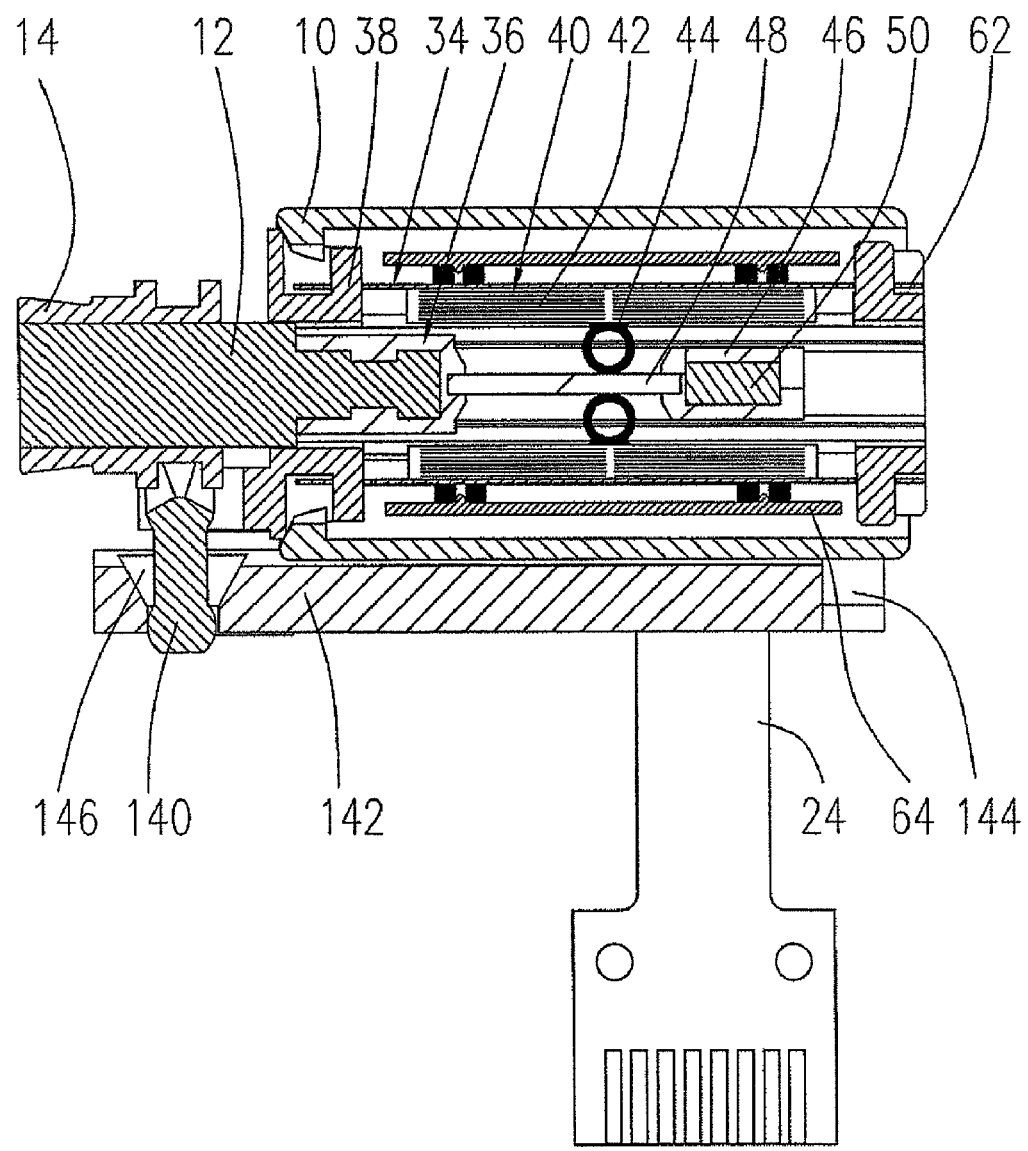
FIG. 7B a sectional view of the linear drive of FIG. 7A.

A further embodiment of the linear drive according to the invention is depicted in FIGS. 7A and 7B in an isometric view and in a sectional view. The sectional plane of FIG. 7B corresponds to the view of FIG. 4, and related components are indicated by the same reference numbers.

The embodiment of FIGS. 7A and 7B differs from the preceding embodiments in that the lever arm 140 is attached to the blocking pin 14 of the sliding element 36. A compensating body 142 is disposed outside the drive housing 10 and is carried in guide rails 144. The compensating body 142 has an opening 146 through which the lever arm 140 is passed. The opening 146 is formed in such a way that the lever arm 140 is pivotably disposed therein.

In a similar way as in the embodiment of FIGS. 6A to 6D, the lever arm 140 is supported by means of stub shafts 148 in a receiving portion 150 connected to the housing 10. At its end facing away from the compensating body 142, the lever arm 140 is forked, thus forming two arms 152, 152' that engage with the outside contour of the blocking pin from opposite sides.

The functioning of the blocking device formed from the compensating body 142 and the lever arm 140 is as described with reference to the preceding embodiments. If the sliding element 36 and thus the compensating body 142 is exposed to a shock load in the direction of translation, the torques generated in the bearing point (148) cancel each other out, so that the system as a whole remains in equilibrium. On the other hand, the pivotal connection of the two arms 152, 152' to the blocking pin 14 and the design of the opening 146 allow the actuator 12 to move into and out of the drive housing 10, the lever 140 deflecting and thus being able to follow this movement.

Figure 8:
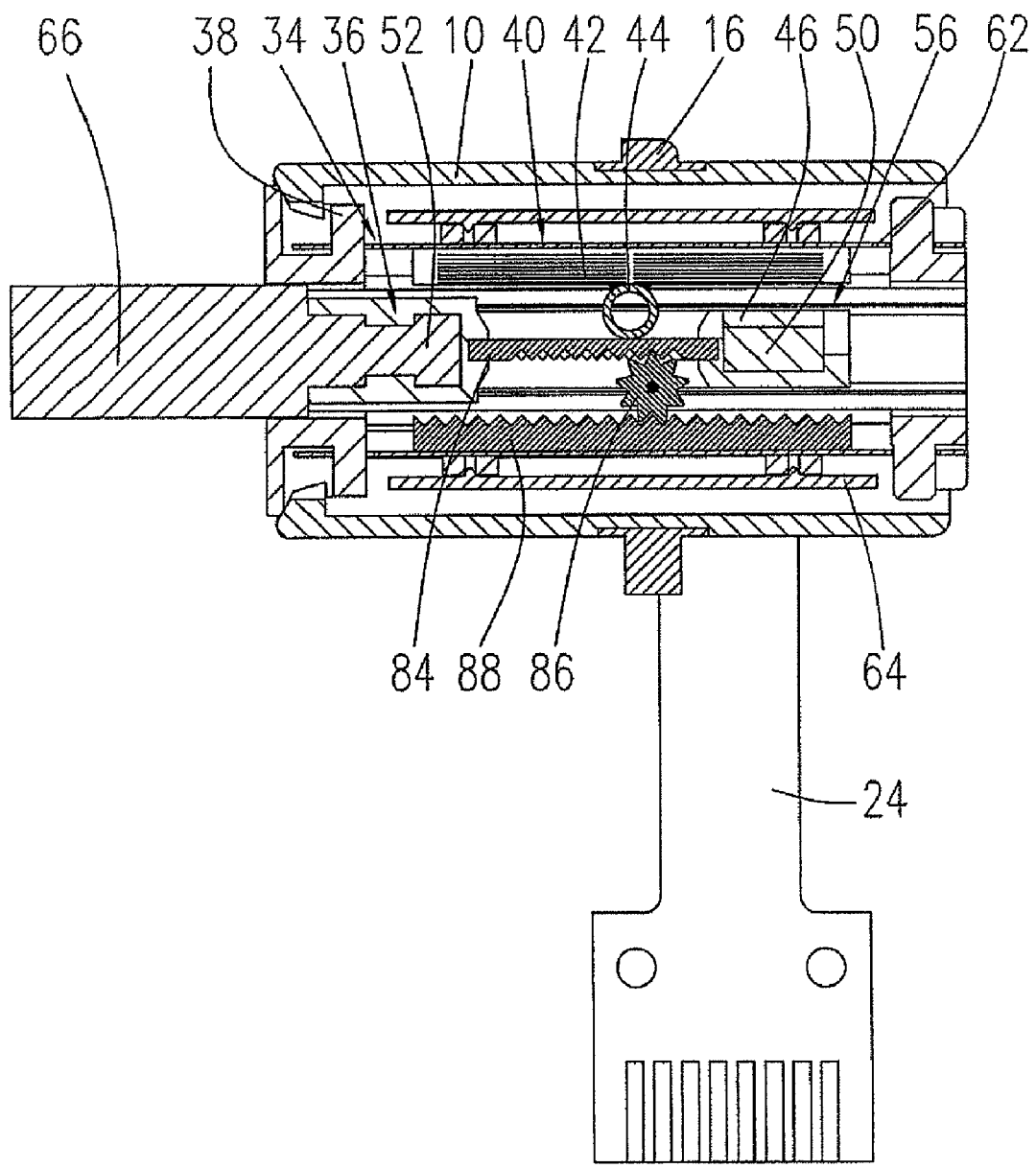
FIG. 8 a sectional view through a friction-coupled linear drive according to a sixth embodiment of the invention.

A further embodiment of the linear drive according to the invention is shown in FIG. 8 in a sectional view. The sectional plane corresponds to the view of FIG. 4, and related components are indicated by the same reference numbers.

In the embodiment of FIG. 8, the drive unit 40 comprises only one drive element 42 and one power transmission element 44 that interacts with a drive rail 84. The side of the drive rail 84 facing away from the power transmission element 44 has the form of a toothed rack and meshes with a toothed wheel 86 that engages with a compensating body 88. The compensating body 88 is disposed within the drive housing 10 where, in the embodiment of FIG. 4, for example, the second drive element is located. The compensating body 88 is slidably guided in the drive housing 10 and its mass is equal to the mass of the sliding element 36 that comprises the actuator 66, the supporting component 36 and the drive rail 84. Should the linear drive undergo a shock load in the direction of translation, this shock load acts equally on the compensating body 88 and the sliding element 36, so as to accelerate these in the direction of translation. Since the acceleration forces on the sliding element 36 and compensating body 88 are the same, the coupling via the toothed wheel 86 prevents a movement of the one or the other in the direction of translation. The system is self retarding. The effect is substantially the same as in the previously described embodiments.

Alongside lock applications, friction-coupled linear motors having a one-sided drive also find application, for example, in auto focus drives. In this kind of application it is again important that the actuator 66 is not displaced when exposed to shock loads or vibration.

Figure 9:
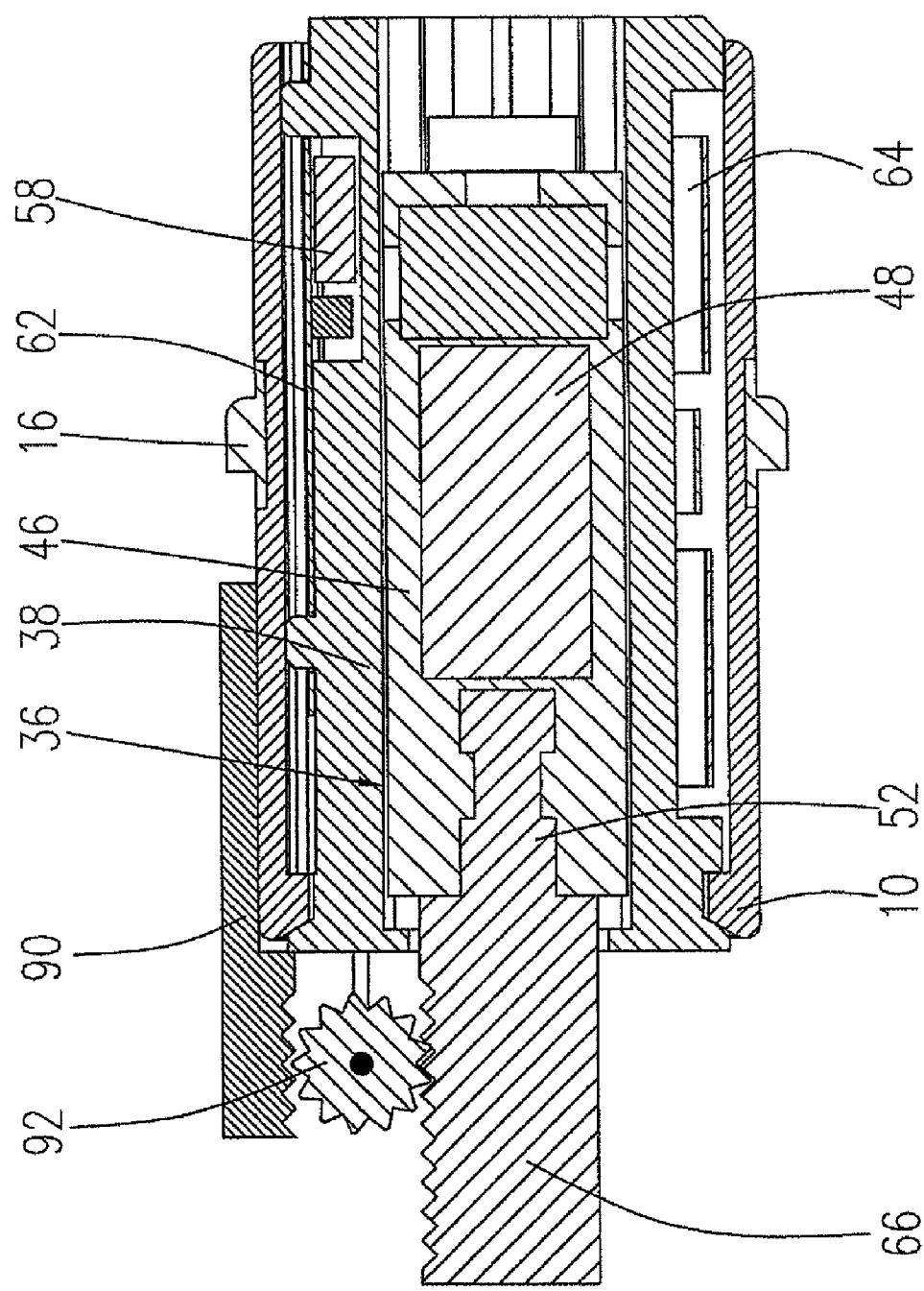
FIG. 9 a sectional view through a friction-coupled linear drive according to a seventh embodiment of the invention.

A modification of the embodiment illustrated in FIG. 8 is shown in FIG. 9. The sectional plane of the sectional view of FIG. 9 corresponds to that of FIG. 5. Related parts are indicated by the same reference numbers.

The embodiment of FIG. 9 differs from FIG. 8 in that the sliding element 36 is again driven by two drive elements (not illustrated in the figure) and that the compensating body 90 is disposed outside the drive housing 10. It is coupled with the sliding element 36, more specifically with the actuator 66 using a toothed wheel 92. For this purpose, the compensating body 90 and the actuator 66 are designed like toothed racks on one side. The effect thus achieved is described as with reference to FIG. 8.

Figure 10:
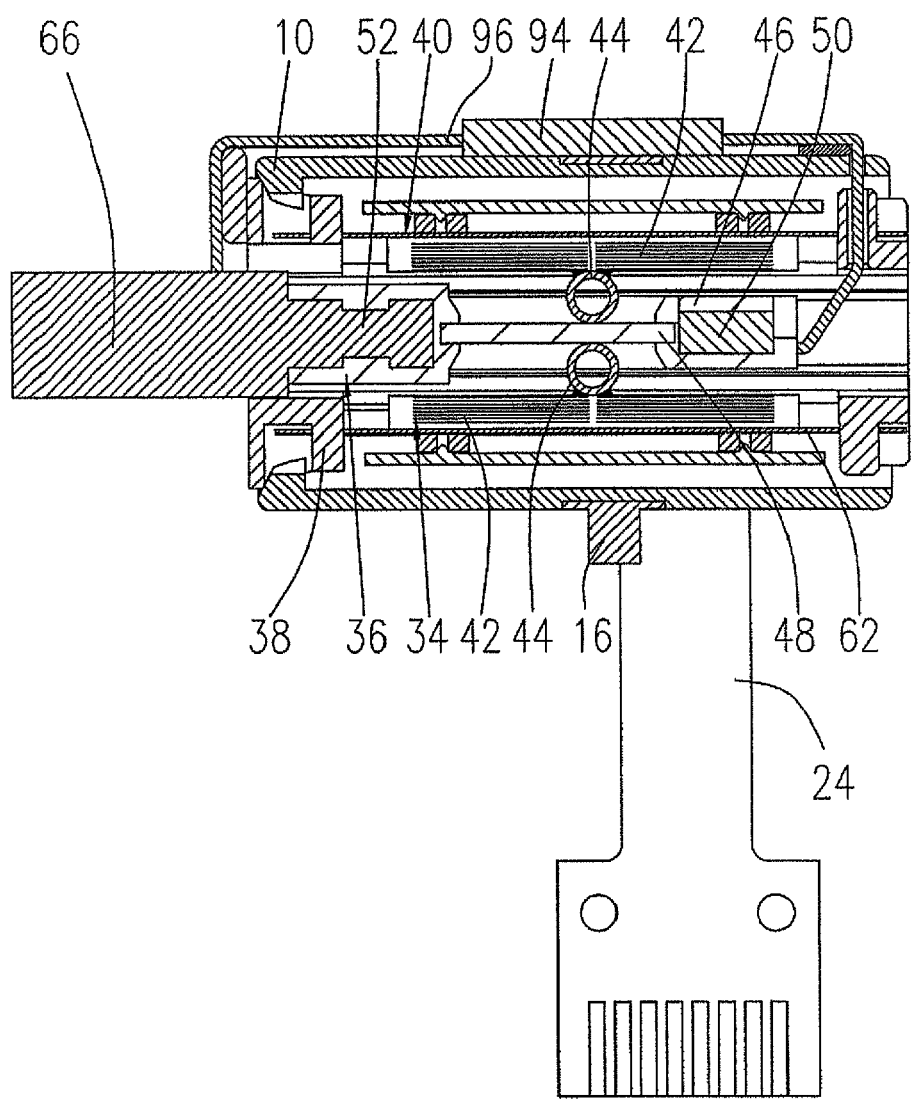
FIG. 10 a sectional view through a friction-coupled linear drive according to an eighth embodiment of the invention.

Yet a further embodiment of the invention is shown in FIG. 10. The sectional view of FIG. 10 extends through the same sectional plane as that of FIG. 4. Related components are indicated by the same reference numbers.

The embodiment of FIG. 10 differs from the preceding embodiments in that the compensating body 94 is connected to the sliding element 36 using a Bowden cable 96. The Bowden cable 96 is carried on the frame component 38 and engages with the actuator 66 as well as the end of the sliding element 36 facing away from the actuator. The mass of the compensating body 94 is equal to the mass of the sliding element 36 that comprises the actuator 66, the supporting component 46, the drive rail 48 and the sensor magnet 50. In the event of a shock load to the linear drive in the direction of translation, it acts equally on the compensating body 94 and the sliding element 36, so as to move both in the same direction. Due to the coupling via the Bowden cable 96, the compensating body 94 and the sliding element 36 block each other, and the system is self retarding. The effect is basically the same as described above with reference to the other embodiments.

Figure 11:
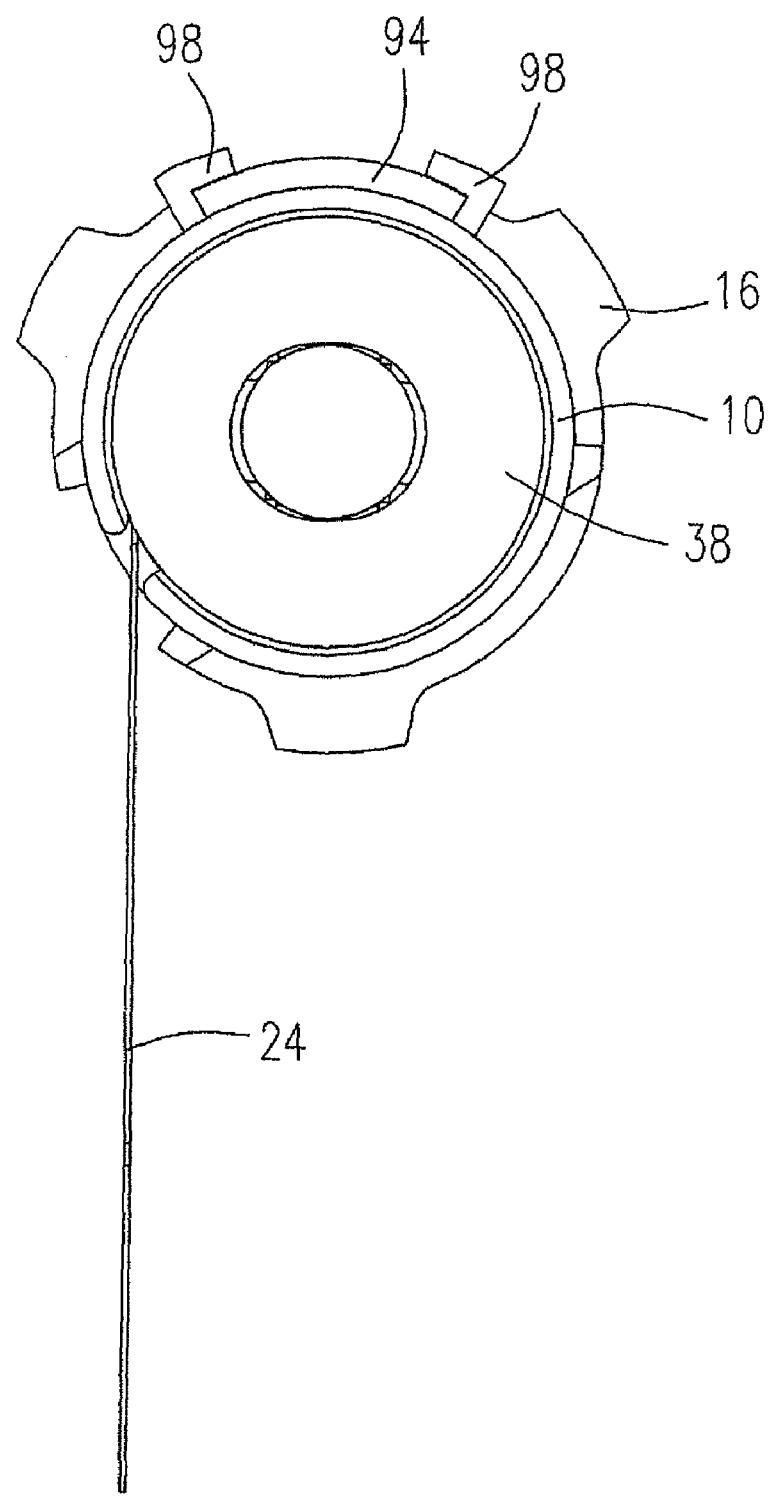
FIG. 11 a front view of the linear drive of FIG. 10.

FIG. 11 shows a front view of the linear drive of FIG. 10 to better illustrate the design of the compensating body 94 that takes the form of a cylinder segment and rests slidably on the drive housing 10. The compensating body 94 is slidably guided on the drive housing 10 using guiding components 98. Alternatively, the compensating body could also be guided within the drive housing 10. This method of guiding the compensating body 94 can conceivably be used for all variants having compensating body that are located externally.

It basically applies to all previously described embodiments that the compensating body may be disposed and guided within or outside the drive housing. In the same way, the coupling mechanism, such as the lever arm, toothed wheel or Bowden cable, can be disposed and guided within and/or outside the drive housing. The weight of the sliding element and the weight of the compensating body should—in accordance with the lever principle where applicable—be the same.

Figure 12:
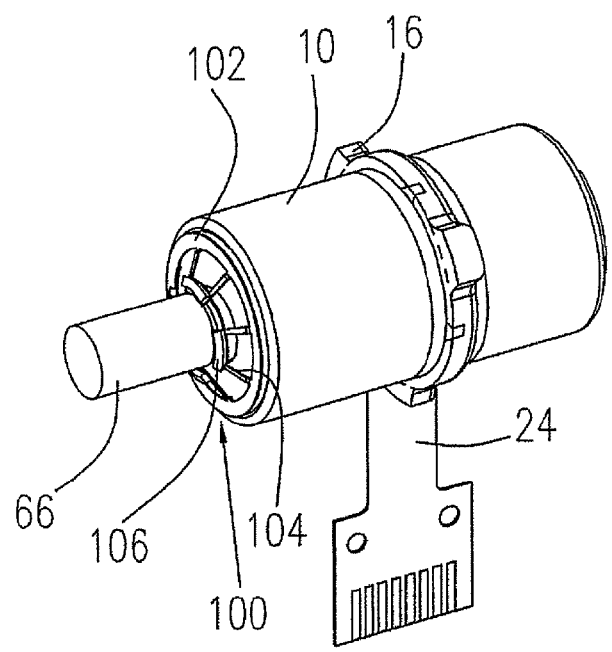
FIG. 12 an isometric view of a friction-coupled linear drive according to a ninth embodiment of the invention.
Figure 13:
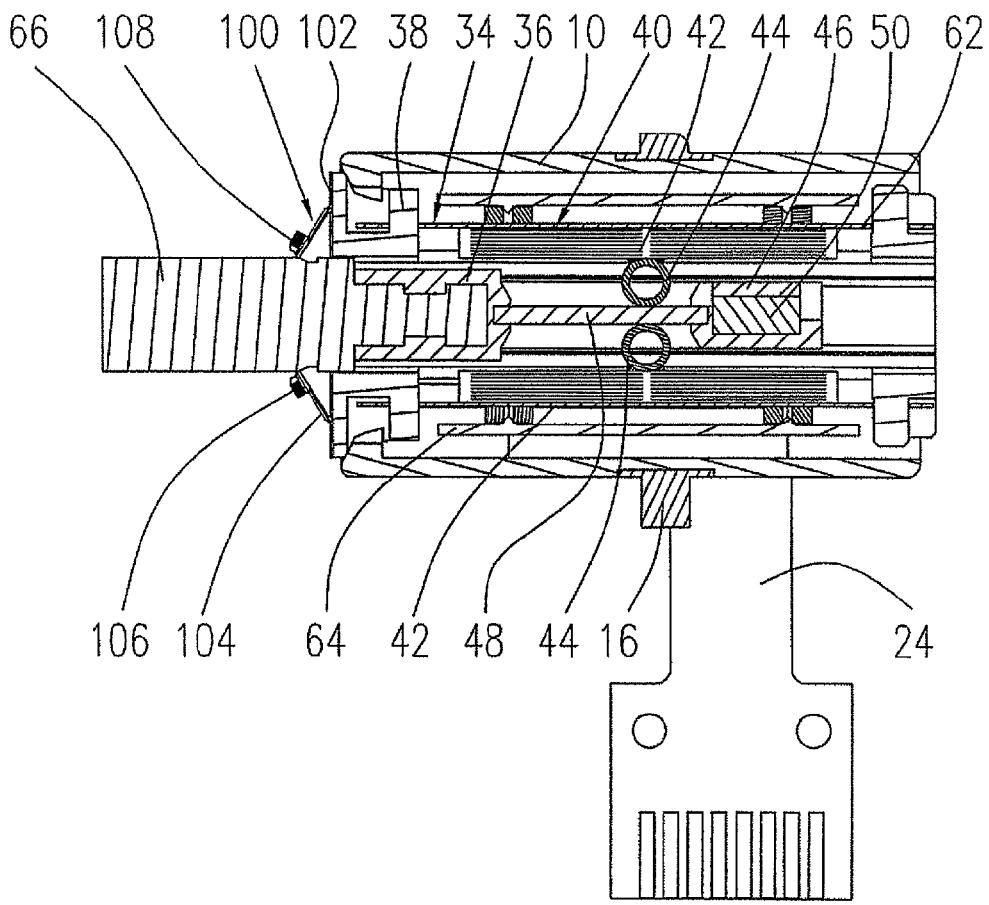
FIG. 13 a sectional view through the linear drive of FIG. 12.

Another embodiment of the linear motor according to the invention is shown in FIGS. 12 and 13, FIG. 12 depicting an isometric view of the linear drive and FIG. 13 showing a sectional view of the linear drive that extends through the same sectional plane as the view of FIG. 4. Related components are indicated by the same reference numbers.

Figure 14:
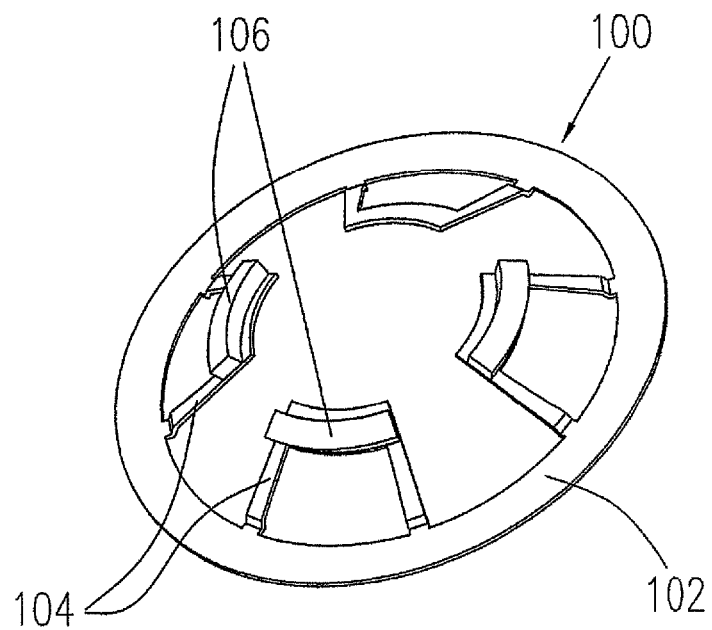
FIG. 14 an isometric view of an annular spring that is used in the linear drive of FIG. 12.
Figure 15:
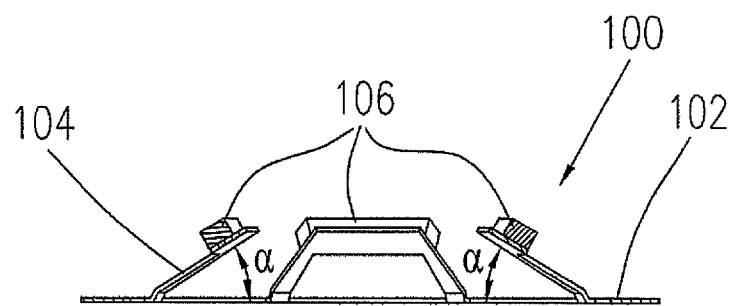
FIG. 15 a side view of the annular spring of FIG. 14.

In the embodiment illustrated in FIGS. 12 and 13, the blocking device is formed by a spring device 100 that is designed in such a way that it is deflected by a shock load so as to become engaged with the sliding element 36 or its actuator 66 respectively. This spring device 100 of the embodiment illustrated in FIGS. 12 and 13 is shown in FIGS. 14 and 15 in an isometric view and a side view respectively. In this embodiment, the spring device comprises a spring ring 102 having a plurality of radially inwards extending spring arms 104, each carrying a compensating body 106. The spring ring 102 and the spring arms 104 are disposed about the actuator 66. Any desired number of spring arms 104 may be provided, a plurality of spring arms being distributed as evenly as possible about the circumference of the spring ring 102. The spring arms may be designed, as in the illustrated embodiment, as double arms or also as single arms. In the illustrated embodiment, the ring 102 is connected to the frame component 48 or the drive housing 10, and the spring arms 104 extend with respect to the ring 102 at an angle $\alpha$ (see FIG. 15) in the direction of the actuator 66. Angle $\alpha$ is approximately 30° C. and preferably lies in a range of 10° to 80°. Basically every angle 0°<$\alpha$<90° is conceivable.

The spring device 100, including the compensating body 106 carried on the spring arms 104, is designed such that the spring arms deflect in the event of a shock load to the linear drive in the direction of translation. Advantage is taken of the fact that a shock load causes the spring arms 104 to become pressed together, i.e. a becomes smaller, and at the same time to move in a radially inwards direction. Here, the spring arms 104 come to lie against the outside circumference of the actuator 66 as shown in FIGS. 12 and 13, and block the movement of the actuator 66. In order to intensify this blocking or arresting effect of the spring device 100, the actuator 66 preferably has a groove 108 into which the free ends of the spring arms 104 become engaged and/or the spring arms 104 are coated with a high friction material layer, such as rubber.

In realizing the embodiment of the invention illustrated in FIGS. 12 to 15, the spring constant of the spring device 100 and the mass of the compensating body 106 should be designed such that, when exposed to a shock load that can be expected, the radial movement of the spring arms 104 and the translation displacement of the sliding element 36 are matched to each other in such a way that the free ends of the spring arms 104 come to lie in the groove 108. Suitable ratios can be determined without too much effort.

The spring device shown in FIGS. 14 and 15 comprises an annular spring having radially inwards extending spring arms that are also shown in FIGS. 12 and 13. The spring device 100 of FIGS. 12 to 15 has a one-sided function, which means a movement of the actuator 66 due to a shock load is only retarded if the direction of excitation of the shock load reduces the size of the angle $\alpha$ of the spring arms 104. This kind of spring device may also be provided with additional spring arms that extend at an angle –$\alpha$ with respect to the ring; this makes it possible to realize a spring device that, in the event of shock loads, can form a retarding effect in both directions of translation.

Figure 16:
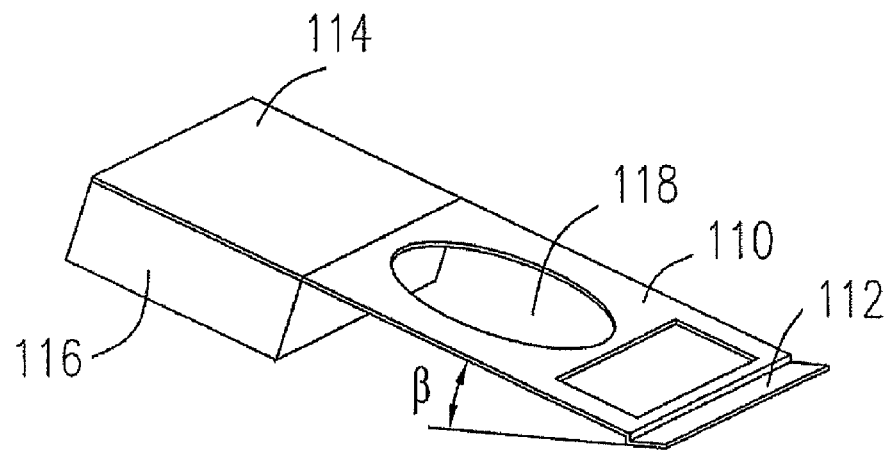
FIG. 16 an isometric view of an alternative embodiment of a spring that can be used as a blocking device in a friction-coupled linear drive.
Figure 17:
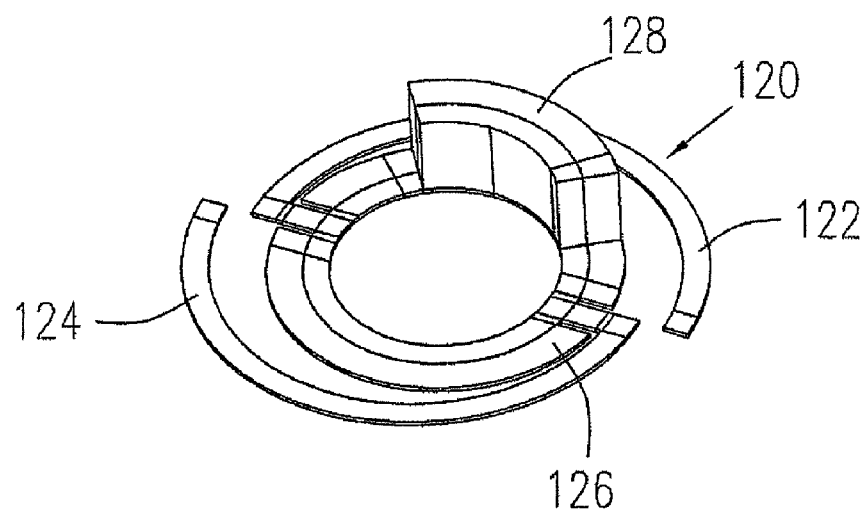
FIG. 17 an isometric view of an alternative embodiment of the spring acting as a blocking device.
Figure 18:
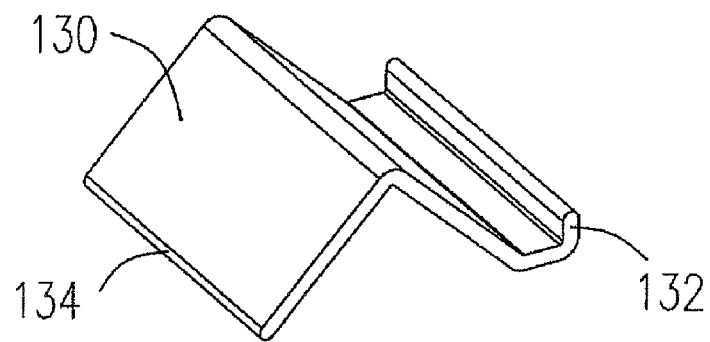
FIG. 18 an isometric view of a further alternative embodiment of the spring used as a blocking device.

Instead of this annular spring, alternative spring devices may be used that are depicted in isometric views in FIGS. 16, 17 and 18. The spring device of FIG. 16 comprises a leaf spring 110 that is connected at one end 112 to the frame and at the other end 114 carries a compensating body 116. The leaf spring 110 has a recess 118 through which the sliding element 36 or the actuator 66 can be led. The leaf spring 110 is preferably designed such that it is bent at an angle $\beta$ with respect to its end 112 fixed to the frame component 38. The angle $\beta$ is, for example, 20° and lies preferably in the range of 10° to 45°.

The leaf spring 110 can be used in the linear drive of FIGS. 12 and 13 instead of the spring device 100, the sliding element 66 passing through the recess 118. In the event of a shock load in the direction of translation, the leaf spring 110 is deflected with respect to its fixed end 112, so that angle increases or decreases. At the same time, the recess 118 also makes a movement in a radial direction of the linear drive and can thus engage with the actuator 66 of the sliding element 36. The actuator 66 in turn preferably has a groove that interacts with the recess 118. The spring constant of the leaf spring 110 and the mass of the weight 116 should in turn be chosen such that the acceleration of the leaf spring 110 generated by the shock load brings about the effective arrest of the spring in the groove 108 in the actuator 16.

Instead of the spring ring illustrated in FIGS. 14 and 15 or the leaf spring illustrated in FIG. 16, a suspension spring 120 may also be used as a blocking device as depicted in FIG. 17 in an isometric view. The suspension spring 120 has two pendulum arms 122, 124 that are connected on one side to the frame component 38 and on the other side carry a pendulum ring 126 that in turn carries a compensating body 128. A shock load to the linear drive and thus to the suspension spring 120 results in the pendulum ring 126 tilting and thus also deflecting in a radial direction. The actuator 66 of the sliding element 36 is led through the pendulum ring 126, and the pendulum ring 126 engages with the actuator 66, preferably with the groove 108 in the actuator 66 when it is deflected or tilted. Again in this embodiment, the spring constant of the suspension spring 126 and the mass of the weight 118 should be chosen such that when exposed to the stress that can be expected, the pendulum ring 126 comes to lie as far as possible in the groove 108 of the sliding element 66.

A further embodiment of a blocking device for a linear drive is shown in FIG. 18. It comprises a bent leaf spring 130 that is clamped at one end 134 in the frame component 38 and whose other free end 132 can be made to engage with the sliding element 36. A compensating body for absorbing a shock load is integrated in the leaf spring 130 in that the leaf spring 130 itself forms this compensating body or such a compensating body is additionally mounted on the leaf spring (not illustrated in the figure). When a shock load acts in the direction of translation on the linear drive, the same stress also acts on the leaf spring 130 (from above in the view of FIG. 18 for example), so that the leaf spring 130 is stretched by this shock load and end 132 moves away from end 134 (to the right in FIG. 18). The behavior of the leaf spring 130 can be taken advantage of so as to make the end 132 engage with a recess of the sliding element 36. The end 132 is bent so that it catches in the recess of the sliding element 36 and no longer springs back independently. The sliding element 36 has to be moved by the drive unit 40 away from the spring, i.e. in the opposite direction to the direction of excitation of the shock load, in order to free it. Shape, spring constant and mass of the leaf spring 130 should be adapted to the shock loads that can be expected in order to ensure that the end 134 of the leaf spring 130 comes to lie in a corresponding recess in the sliding element 36.

IDENTIFICATION REFERENCE LIST

- 10 Drive housing
- 12 Actuator
- 14 Blocking pin
- 16 Elastomer members
- 18 Compensating body
- 20 Lever arm
- 22 Bearing point
- 24 Connecting component
- 26 Swivel pin
- 28 Long slot
- 30 Stub shaft
- 34 Stator
- 36 Sliding element
- 38 Frame component
- 40 Drive unit
- 42 Drive element
- 44 Power transmission elements
- 46 Supporting component
- 48 Drive rail
- 50 Sensor magnet
- 52 Adapter piece
- 54, 56 Sliding bearings
- 58 Hall sensor
- 58 Circuit board
- 62 Clamp
- 64 Actuator
- 66 Lever arm
- 70, 70' Compensating body
- 72 Bearing point
- 74 Long slot
- 76 Compensating body
- 78 Lever arm
- 80 Stub shaft
- 82 Receiving portion
- 84 Drive rail
- 86 Toothed wheel
- 88 Compensating body
- 90 Compensating body
- 92 Toothed wheel
- 94 Compensating body
- 96 Bowden cable
- 98 Guiding components
- 100 Spring device
- 102 Spring ring
- 104 Spring arms
- 106 Compensating body
- 108 Groove
- 110 Leaf spring
- 112, 114 End of the leaf spring
- 116 Compensating body
- 118 Recess
- 120 Suspension spring
- 122, 124 Pendulum arms
- 126 Pendulum ring
- 128 Compensating body
- 130 Leaf spring
- 132, 134 End of the leaf spring
- 140 Lever arm
- 142 Compensating body
- 144 Guide rails
- 146 Opening
- 148 Stub shaft
- 150 Receiving portion
- 152, 152' Arms

We claim:

1. A linear drive comprising a drive unit (40) and a sliding element (36) that are disposed in a frame (38), wherein the sliding element (36), actuated by the drive unit (40), is capable of effecting a movement in a direction of translation with respect to the frame (38), and having a blocking device for blocking the sliding element (36) with respect to the frame (38) in the event of a shock load to the sliding element (36), wherein the blocking device has a compensating body (18; 70; 88; 90; 94) coupled to the sliding element (36), the compensating body (18; 70; 88; 90; 94) being likewise exposed to the shock load and disposed such that an acceleration of the compensating body caused by the shock load counteracts an acceleration of the sliding element caused by the shock load.

2. A linear device according to claim 1, wherein the compensating body (18; 70; 70) is coupled with the sliding element (36) using a level arm (20; 68, 78) wherein one end of the lever arm interacts with the sliding element and the other end of the lever arm interacts with the compensating body.

3. A linear drive according to claim 1, wherein the lever arm (20; 68; 78) is supported on the frame (38) or the housing (10) using a bearing point (22) or a hinge pin (26).

4. A linear drive according to claim 2, wherein the mass of the compensating body (18; 70; 70') with respect to the mass of the sliding element (36) is chosen such that the sum of the torques that, due to a shock load in the direction of translation, act on the lever arm (20; 68; 78) is zero or approximately zero.

5. A linear drive according to claim 1, wherein the compensating body (94) is coupled with the sliding element using a Bowden cable (96).

6. A linear drive according to claim 1, wherein the compensating body (88; 90) is coupled with the sliding element using a toothed wheel (86; 92) and a toothed rack.

7. A linear drive according to claim 1, wherein the mass of the compensating body (88; 90; 94) is equal to or approximately equal to the mass of the sliding element (36).

8. A linear drive according to claim 1, wherein the compensating body is guided on the frame, within or outside the frame.

9. A linear device comprising a drive unit (40) and a sliding element (36) that are disposed in a frame (38), wherein the sliding element (36), actuated by the drive unit (40), is capable of effecting a movement in a direction of translation with respect to the frame (38), and having a block device for blocking the sliding element (36) with respect to the frame (38) in the event of a shock load to the sliding element (36), wherein the blocking device has a compensating body (106; 116; 128) that is likewise exposed to the shock load and disposed such that the movement of the compensating body (106; 116; 128) caused by the shock load counteracts a movement of the sliding element (36) caused by the shock load.

10. A linear device according to claim 9, wherein the blocking device has a spring device (100) that is coupled with the compensating body (106) and designed such that it is deflected by the shock load so as to become engaged with the sliding element (36).

11. A linear device according to claim 10, wherein the spring device (100) is fixed to the frame (38) and has at least one spring arm (104) that extends in the direction of the sliding element (36).

12. A linear device according to claim 11, wherein the compensating body (106) is disposed on the spring arm (104).

13. A linear drive according to claim 10, wherein the spring device comprises a spring ring (102) having a number of radially inwards extending spring arms (104) and the spring ring (102) encloses the sliding element (36) and wherein a compensating body (106) is disposed on each spring arm (104).

14. A linear drive according to claim 10, wherein the spring device has a leaf spring (110) that is connected at one end to the frame (38) and carries the compensating body (116) at the other end.

15. A linear drive according to claim 14, wherein the leaf spring (110) has a recess (118) through which the sliding element (36) is passed.

16. A linear drive according to claim 10, wherein the spring device has a suspension spring (120) that is connected to the frame (38) via two pendulum arms (122, 124).

17. A linear drive according to claim 16, wherein the suspension spring (120) has a recess through which the sliding element (38) is passed.

18. A linear drive according to claim 9, wherein the blocking device has a bent leaf spring (130) that comprises the compensating body and is designed such that it is stretched by the shock load so as to become engaged with the sliding element (36).

19. A linear drive according to claim 18, wherein on end of the bent leaf spring (130) is connected to the frame (38) and the other end can be made to engage with the sliding element (36).

20. A linear drive according to claim 9, wherein the sliding element (36) has a groove (108) in which the blocking device can engage.

21. A linear drive according to claim 9, wherein the drive unit (40) and the sliding element (36) are directly coupled.

22. A linear drive according to claim 21, wherein the drive unit (40) and the sliding element (36) are friction coupled.

* * * * *